Aug. 4, 1942.  C. P. MARTIN  2,292,236
PROD
Filed Jan. 14, 1941
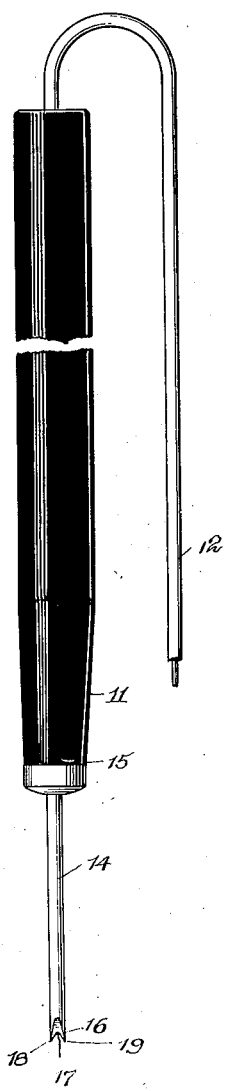
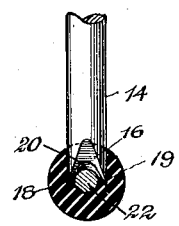
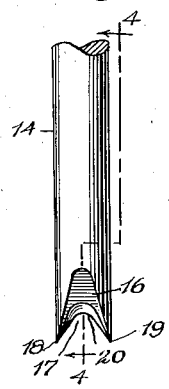
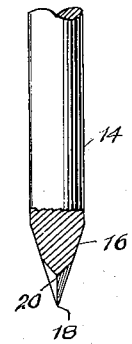
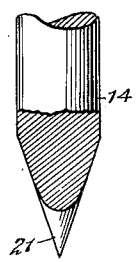
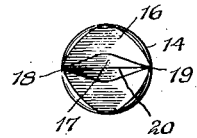
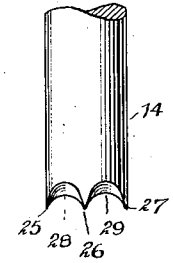
INVENTOR.
Carl P. Martin
BY
ATTORNEYS
WITNESSES Patented Aug. 4, 1942

2,292,236

UNITED STATES PATENT OFFICE 2,292,236

PROD

Carl P. Martin, New York, N. Y.

Application January 14, 1941, Serial No. 374,323

3 Claims. (Cl. 173—340)

This invention relates to test prods and more particularly to the type of prod used in testing radio and similar equipment. These prods are normally used in association with voltmeters and similar equipment in order to test the various contacts of a radio system.

A tester normally uses one or more prods attached to a meter to check the operation of the various functional units for the purpose of discovering defective equipment, current leaks, loose connections, etc. Normally a wire runs from the prod to the meter. The prod is provided with an insulated handle and a point with which contact is made.

This invention relates particularly to an improved tip for use on test prods.

An object of the invention is to provide a tip having certain non-skid features so that the operator may more readily make contact with the various wires and terminals necessary for testing. Various parts of the radio may employ different voltages and it is important that voltmeters adapted for use in testing low voltages should not be subjected to high voltages since to do so would ruin the equipment. It will be appreciated that an operator making a test of this type must keep one eye on the meter and another on his hands so that the possibility of slipping is far from remote. In the use of the ordinary test prod the tip quite often accidentally comes in contact with high voltages or with terminals not desired to be contacted due to slipping of the tip off a wire or contact point while the test is being made.

It is therefore the primary purpose of this invention to provide a tip with which there will be less danger of slipping or touching the wrong contacts and which will operate more efficiently to gain better contact with the wire or contact point used in the testing.

In the accompanying drawing—

Fig. 1 is an enlarged elevation of the conventional test prod embodying my improved tip;

Fig. 2 is a side elevation of the tip of a prod embodying my invention being applied to a wire or contact point;

Fig. 3 is an enlarged view of a tip constructed in accordance with my invention;

Fig. 4 is a view, partly in cross-section, taken on the line 4—4 of Fig. 3;

Fig. 5 is an end view of the tip;

Fig. 6 is a view similar to Fig. 4, of a tip with rounded contact surface;

Fig. 7 is a side view of a modification of my invention;

Fig. 8 is an end view of the modification shown in Fig. 7.

As has been previously pointed out, tips on test prods are normally ground or formed with a sharp point. When placed on a rounded surface the sharp point or tip has a tendency to slide or slip off with the possibility of engaging some other portion of the equipment.

As shown in Fig. 1, I provide the conventional test prod handle 11 having a connecting wire 12 running to the voltmeter or other testing apparatus and having a tip 14 fastened to the end 15 of the handle 11 in the usual manner. The tip 14 instead of being pointed, as is customary, is provided with a bifurcated end 16 which may be ground or otherwise formed to produce a groove 17 and two points 18 and 19. The tip may be ground with a sharpened edge 20 to provide a sharp contact point, or it may be provided with a rounded inside surface 21, as shown in Fig. 6.

When my improved tip is used it is applied to a wire or contact point 22 in the usual manner except that instead of merely one point of the tip contacting the member 22, the surface of the groove 17 contacts the member 22 at several points, thus providing more complete contact and preventing the prod from slipping off the contact member. Where the edge 20 is sharpened, as shown in Fig. 3, longitudinal as well as lateral slipping will be avoided, and it will be possible to test wire at any point along its length without danger of the prod slipping in either direction.

It may be possible that in certain types of work more than one groove is desirable. In the modification shown in Figs. 7 and 8, I have shown a tip with a series of points 25, 26 and 27, forming grooves 28 and 29, which may have sharpened inner edges if desired. It will be appreciated that any number of points within reason may be placed at the end of the tip to form a series of grooves as well as a single groove 17.

I claim:

1. In a test prod for taking electrical measurements, a tip ground at its outer end to form a concave edge terminating at either end in a sharp point, in prolongation of said tip said edge forming contact means for engaging circuit elements to be tested and the points at the end of said edge permitting contact with flat surfaces.

2. A test prod for momentarily contacting wire, lugs and other electric circuit elements for the purpose of taking electrical measurements, said test prod having a tip ground at its outer end to form a concave sharp edge terminating at either end in a sharp point extending in prolongation of said tip.

3. In a test prod for taking electrical measurements, a conducting shaft, a handle associated with said shaft, the tip of said shaft being ground to form a concave edge terminating at either end in a sharp point, said points extending in prolongation of said shaft.

CARL P. MARTIN.